United States Patent
Woo et al.

(10) Patent No.: US 8,612,033 B2
(45) Date of Patent: Dec. 17, 2013

(54) METHOD FOR EXECUTING MENU IN MOBILE TERMINAL AND MOBILE TERMINAL THEREOF

(75) Inventors: Sungmin Woo, Seoul (KR); Minyoung Eom, Seoul (KR); Moonsoo Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 12/839,714

(22) Filed: Jul. 20, 2010

(65) Prior Publication Data

US 2011/0022203 A1    Jan. 27, 2011

(30) Foreign Application Priority Data

Jul. 24, 2009  (KR) .................. 10-2009-0067906
Aug. 19, 2009  (KR) .................. 10-2009-0076591

(51) Int. Cl.
*G06F 17/00*     (2006.01)

(52) U.S. Cl.
USPC ......... 700/94; 348/468; 379/388.03; 715/716

(58) Field of Classification Search
None
See application file for complete search history.

(56) References Cited

U.S. PATENT DOCUMENTS

| | | | |
|---|---|---|---|
| 6,195,570 B1 * | 2/2001 | Ishida | 455/566 |
| 7,027,841 B2 * | 4/2006 | Ishii | 455/569.1 |
| 2006/0030336 A1 * | 2/2006 | Lee | 455/456.2 |
| 2006/0285677 A1 * | 12/2006 | Souma | 379/388.03 |
| 2006/0290807 A1 * | 12/2006 | Kim | 348/468 |
| 2007/0140187 A1 * | 6/2007 | Rokusek et al. | 370/338 |
| 2007/0233905 A1 * | 10/2007 | Hatano et al. | 710/16 |
| 2010/0001967 A1 * | 1/2010 | Yoo | 345/173 |

* cited by examiner

*Primary Examiner* — Fan Tsang
*Assistant Examiner* — David Siegel
(74) *Attorney, Agent, or Firm* — KED & Associates, LLP

(57) ABSTRACT

A method for executing a menu in a mobile terminal and a mobile terminal thereof are disclosed, wherein the method includes displaying a first screen on a display unit of the mobile terminal, detecting whether an audio output device connection signal is generated by an external audio output device being connected to the mobile terminal while the first screen is displayed, and displaying a second screen including an audio output-related menu if the audio output device connection signal is generated.

10 Claims, 12 Drawing Sheets

METHOD FOR EXECUTING MENU IN MOBILE TERMINAL AND MOBILE TERMINAL THEREOF

Pursuant to 35 U.S.C. §119 (a), this application claims the benefit of earlier filing date and right of priority to Korean Patent Application Nos. 10-2009-0067906, filed on Jul. 24, 2009 and 10-2009-0076591, filed on Aug. 19, 2009, the contents of which are hereby incorporated by reference in their entirety.

BACKGROUND OF THE DISCLOSURE

1. Field

The present disclosure relates to a method for executing menu in a mobile terminal and a mobile terminal thereof, configured for a user to conveniently select a menu in a case an external audio output device is connected.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts.

Concomitant with diversified function of the mobile terminal, the number of menus stored in the mobile terminal has increased, and as a result, demands are also on the increase for a user interface (UI) capable of conveniently and rapidly executing a desired menu.

SUMMARY OF THE DISCLOSURE

The present disclosure is intended to provide a user interface (UI) configured for a user to conveniently execute a desired menu in a case a mobile terminal is connected to an external audio output device.

In one general aspect of the present disclosure, a method for executing a menu in a mobile terminal comprises: displaying a first screen on a display unit of the mobile terminal; detecting whether an audio output device connection signal is generated by an external audio output device being connected to the mobile terminal while the first screen is displayed; and displaying a second screen including an audio output-related menu if the audio output device connection signal is generated.

In some exemplary embodiments of the present disclosure, the step of detecting whether an audio output device connection signal is generated by an external audio output device being connected to the mobile terminal while the first screen is displayed, may comprise: detecting one of whether an earphone connection signal is generated from an ear-jack of the mobile terminal or whether a short range communication module connection signal is generated by the external audio output device being connected to a short range communication module of the mobile terminal.

In some exemplary embodiments of the present disclosure, the audio output-related menu may include at least one of an audio communication menu, an image communication menu, a music file replay menu, an image file replay menu, a radio menu, a broadcasting menu.

In some exemplary embodiments of the present disclosure, the method may further comprise: returning, by the second screen, to the first screen if the connection of the external audio output device is released.

In some exemplary embodiments of the present disclosure, the method may further comprise: displaying broadcasting contents on the display unit by selecting the broadcasting menu; and storing the broadcasting contents on the memory of the mobile terminal if the connection of the external audio output device is released.

In some exemplary embodiments of the present disclosure, the method may comprise: displaying the stored broadcasting contents on the display unit if a re-connection of the external audio output device is implemented, and sequentially deleting the stored broadcasting contents time-wise.

In some exemplary embodiments of the present disclosure, the first screen may be one of wallpaper and a menu screen.

In another general aspect of the present disclosure, a method for executing a menu in a mobile terminal comprises: converting an operation mode to a lock-up state; releasing the lock-up state if connection is made to an audio output device; and displaying an executable menu by selecting any one function of functions necessary for audio output.

In some exemplary embodiments of the present disclosure, the method may further comprise: outputting an audio signal corresponding to the operating function through the audio output device if the function necessary for audio output is under operation during connection to the audio output device.

In some exemplary embodiments of the present disclosure, the method may further comprise: outputting an audio signal corresponding to the operating function through the audio output device if the function necessary for audio output is under operation during connection to the audio output device.

In still another general aspect of the present disclosure, a method for executing a menu in a mobile terminal comprises: detecting separation of an audio output device; outputting an audio signal in a preset audio output mode if an audio outputting function is under operation; and displaying a menu for selecting another operation mode.

In some exemplary embodiments of the present disclosure, the method may comprise: executing communication in a speaker output mode if the separation of an audio output device is detected and if the mobile terminal is under communication status.

In still another general aspect of the present disclosure, a mobile terminal comprises: a display unit configured to display a first screen; and a controller configured to display a second screen including a pre-set audio output-related menu if an audio output device connection signal is generated by an external audio output device being connected to the mobile terminal while the first screen is displayed.

In some exemplary embodiments of the present disclosure, the mobile terminal may further comprise an ear-jack configured to be connected to the external audio output device.

In some exemplary embodiments of the present disclosure, the mobile terminal may further comprise a short range communication module configured to be connected to the external output device.

In some exemplary embodiments of the present disclosure, the controller may return the second screen to the first screen if the connection to the external audio output device is released.

In some exemplary embodiments of the present disclosure, the mobile terminal may further comprise: a memory configured to store data; and a broadcasting reception module configured to receive broadcasting contents, wherein the controller may be configured to store the broadcasting contents on the memory of the mobile terminal if the connection of the external audio output device is released while the display unit is being displayed with the broadcasting contents.

In some exemplary embodiments of the present disclosure, the controller may be configured to display the stored broadcasting contents on the display unit if a re-connection of the external audio output device is implemented, and to sequentially delete the stored broadcasting contents time-wise.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals such as stationary terminals that include digital TVs and desktop computers, the details of which are well known to the persons in the art.

Figure 1:
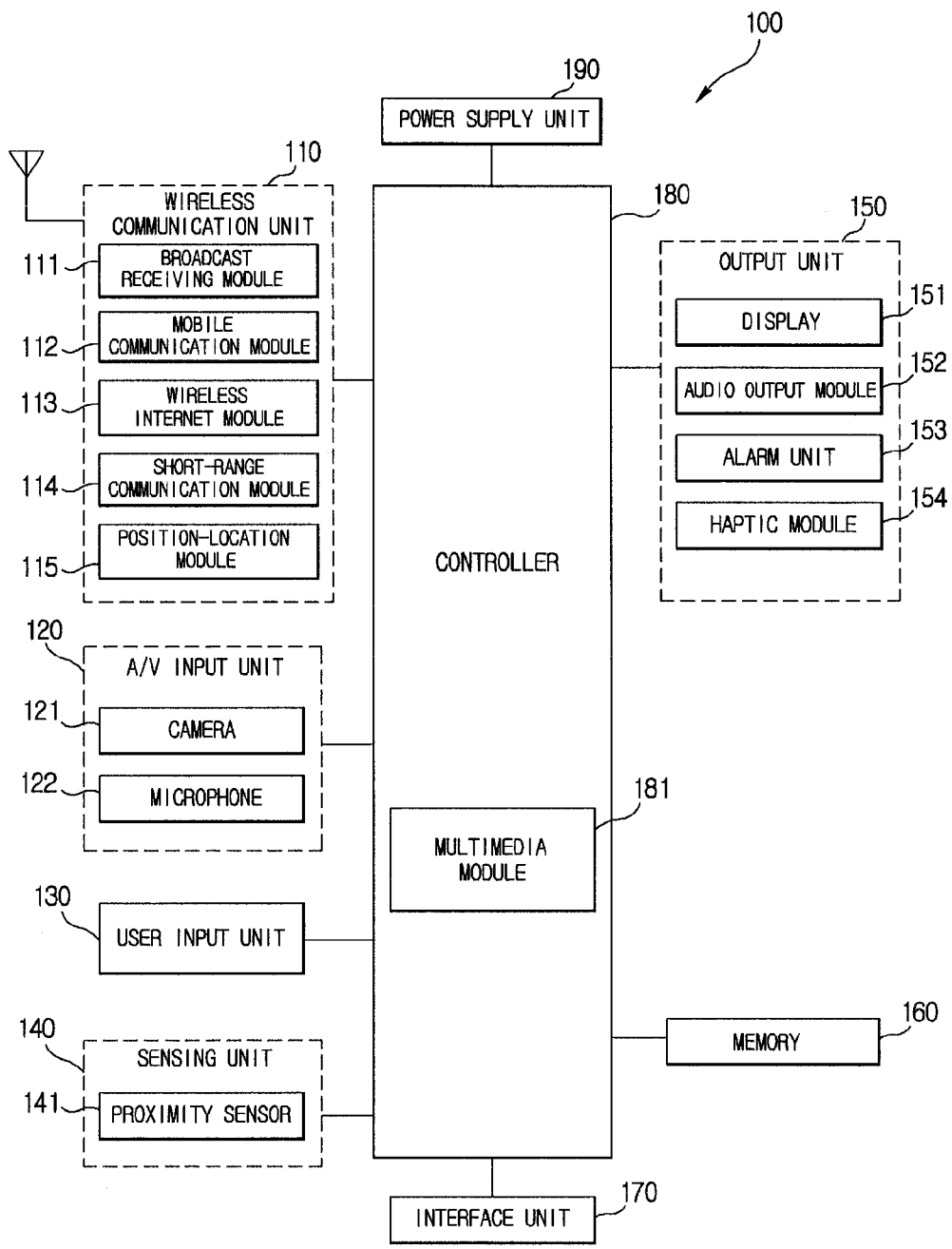
FIG. 1 is a block diagram of a mobile terminal according to an exemplary embodiment of the present disclosure.

FIG. 1 is a block diagram of a mobile terminal in accordance with an exemplary embodiment of the present disclosure. Other embodiments and arrangements may also be provided. FIG. 1 shows a mobile terminal 100 having various components, although other components may also be used. More or fewer components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply unit 190.

The constituent elements shown in FIG. 1 are not essential, such that other mobile terminals may be implemented with fewer elements or more elements than are shown in FIG. 1. Now, the constituent elements will be described in detail.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

Referring to FIG. 1, the audio/video (A/V) input unit 120 may provide audio or video signal input to the mobile terminal 100. The A/V input unit 120 may include a camera 121 and a microphone 122. The camera 121 may receive and process image frames of still pictures and/or video. The processed image frames of still pictures and/or video may be displayed on a display 151.

The image frames processed by the camera 121 may be stored in the memory 160 or may be transmitted to the outside via the wireless communication unit 110. Two or more cameras may be provided according to use environment.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm unit 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two or more displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and/or the like.

The touch sensor 142 may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor 142, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch-screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an event occurrence of the mobile terminal 100. An event occurring in the mobile terminal 100 may include one of a call signal reception, a message reception, a key signal input, a touch input and/or the like. The alarm unit 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm unit 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen. The memory 160 is a concept that includes a buffer temporarily storing data.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply unit 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180 per se.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Now, a method for executing menu (hereinafter referred to as a menu executing method) in a mobile terminal according to exemplary embodiments of the present disclosure will be provided with reference to FIG. 2.

Figure 2:
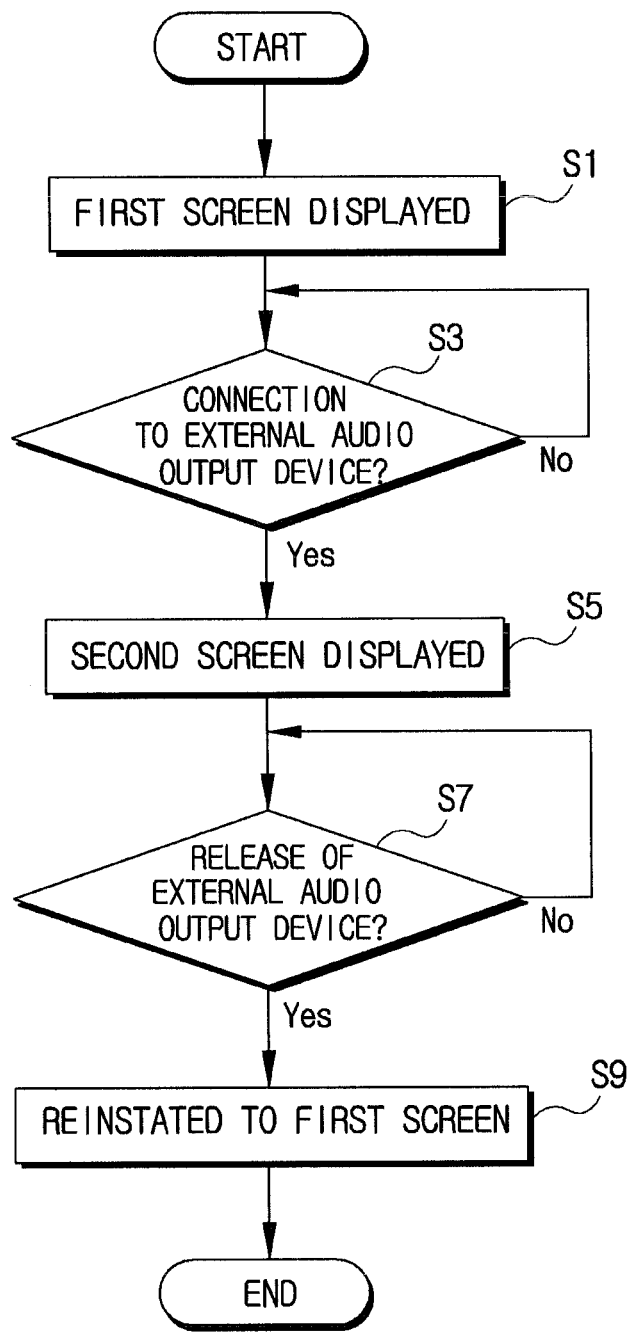
FIG. 2 is a flowchart illustrating a menu-executing method of a mobile terminal according to a first exemplary embodiment of the present disclosure.

FIG. 2 is a flowchart illustrating a menu-executing method of a mobile terminal according to a first exemplary embodiment of the present disclosure.

First, a first screen is displayed on the display 151 of a mobile terminal 100 (S1). The first screen may be wallpaper displayed on the display 151 by way of folder-up or slide-up, or may be a menu screen or a menu executing screen (e.g., Internet screen, broadcasting screen).

A controller 180 may generate an external audio output device connection signal and display a second screen inclusive of an audio output-related menu on the display 151 (S5), in a case an external audio output device is connected to the mobile terminal (S3) while the first screen is displayed on the display 151.

At this time, the external audio output device, which is a wired/wireless headset port or a device outputting an audio data received through a short range communication module, may include a headset, an earphone, an ear microphone, a speaker and the like. The audio output-related menu, which is a menu combination having an audio output as a pre condition, may include at least one of an audio communication menu, an image communication menu, a music file replay menu, an image file replay menu, a radio menu and a broadcasting menu.

The controller 180 may reinstate the second screen to the first screen in response to a release signal in a case connection to the external audio output device connected to the mobile terminal is released while the second screen is displayed (S7, S9).

To be more specific, in a case a user wearing a blue-tooth earphone is positioned outside of an effective distance from the mobile terminal 100, the controller 180 may change the second screen displayed on the display 151 to the first screen based on a connection release signal. For another example, in a case an earphone inserted into the wired/wireless headset port is separated, the controller 180 may change the second screen displayed on the display 151 to the first screen.

To be still more specific, for example, in a case an earphone or blue-tooth earphone connected to the mobile terminal 100 is released while the broadcasting contents are received by the broadcasting receiving module to be displayed on the display 151, the controller 180 may reinstate a display screen to the first screen and automatically store the broadcasting contents in the memory 160 at the same time.

Successively, the controller 180 may controllably replay the broadcasting contents stored in the memory 160. At this time, the controller 180 may allow the broadcasting contents stored in the memory 160 to be displayed on the display 151, and sequentially delete the stored broadcasting contents timewise to reduce the load of the memory in a case re-connection to the external audio output device is implemented.

According to the exemplary embodiment thus configured, in a case an external audio output device such as an earphone is connected, a menu capable of using the connection can be automatically displayed on the display to thereby facilitate the user input convenience.

Now, a first example of a menu-executing method of a mobile terminal according to the first exemplary embodiment will be described with reference to FIG. 3a~FIG. 5.

Figure 3A:
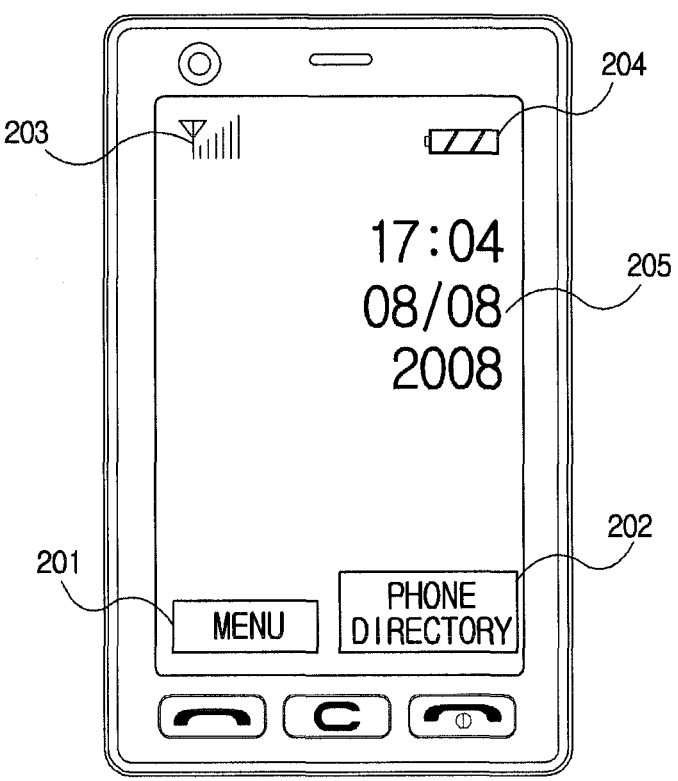
FIGS. 3a and 3b are an image view illustrating a first example of a menu-executing method of a mobile terminal according to a first exemplary embodiment of the present disclosure.
Figure 3B:
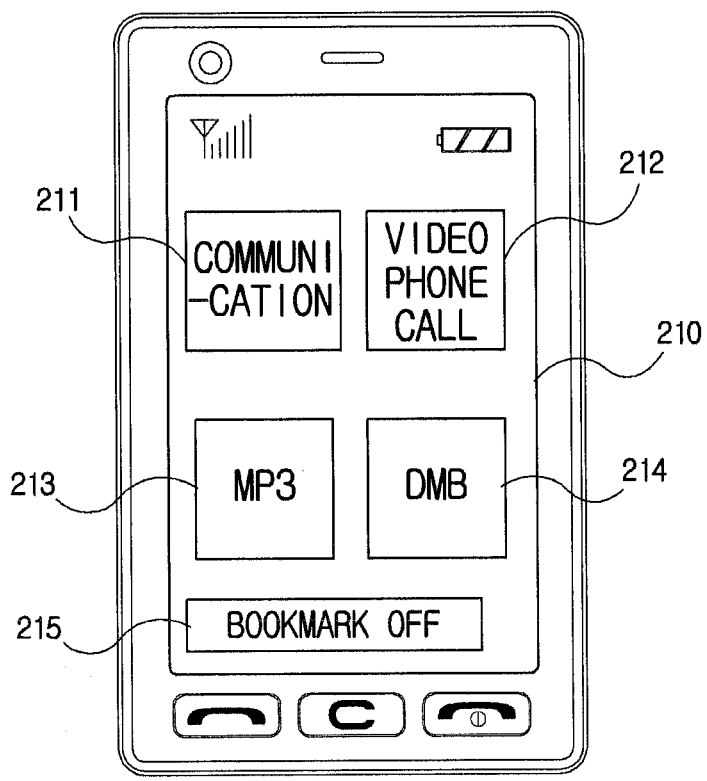
Figure 4A:
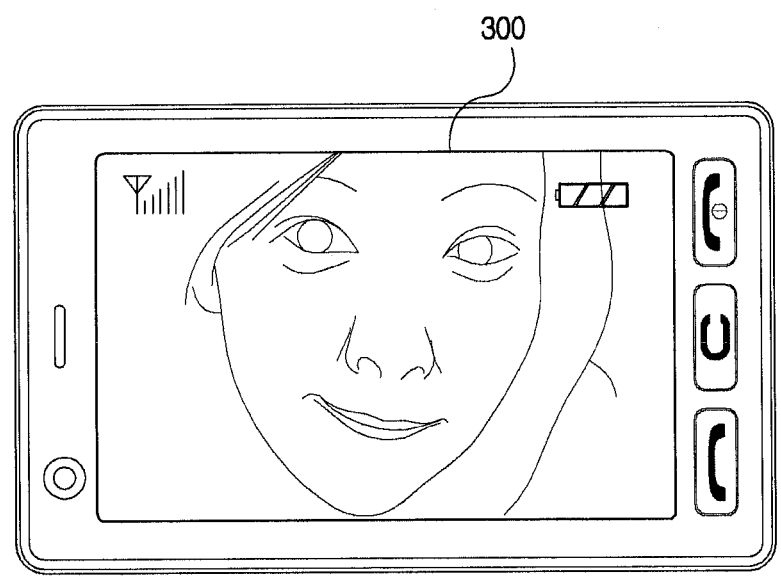
FIGS. 4a~4d are an image view illustrating a second example of a menu-executing method of a mobile terminal according to a first exemplary embodiment of the present disclosure.
Figure 4B:
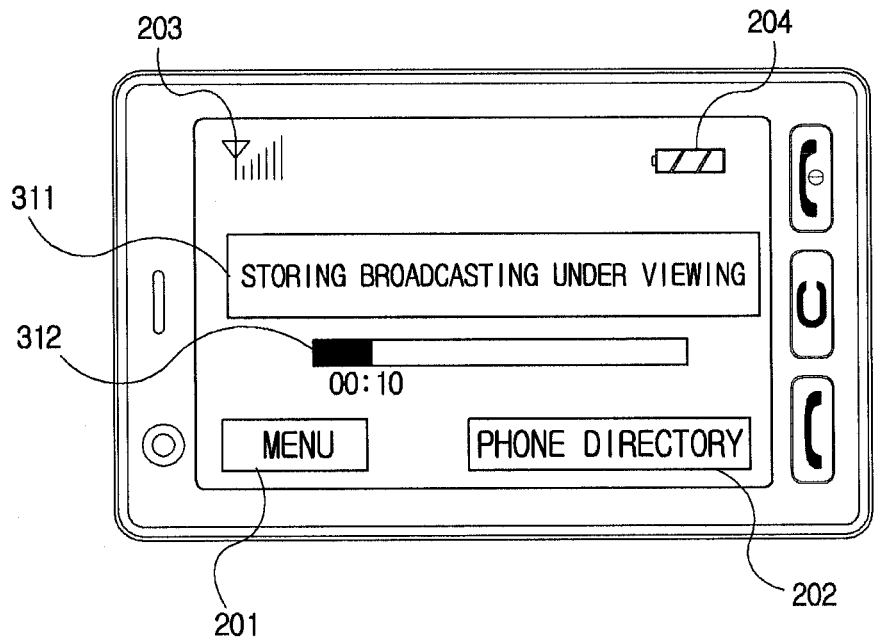
Figure 4C:
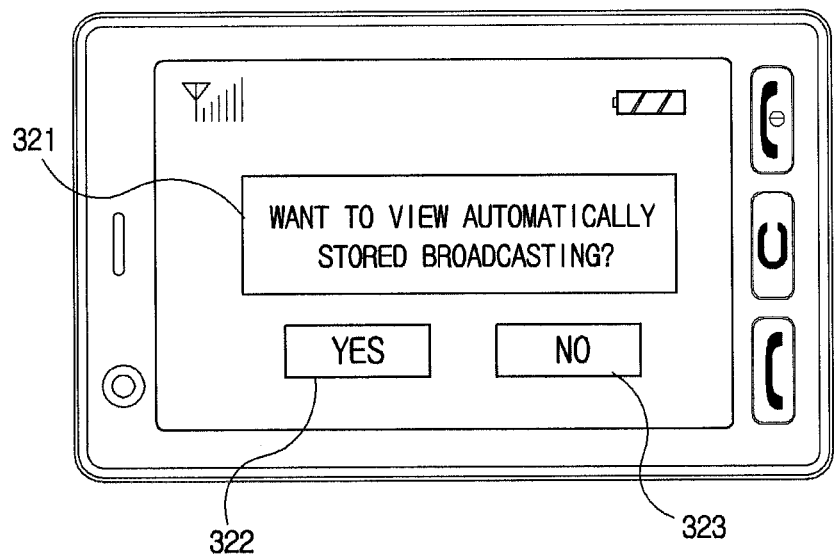
Figure 4D:
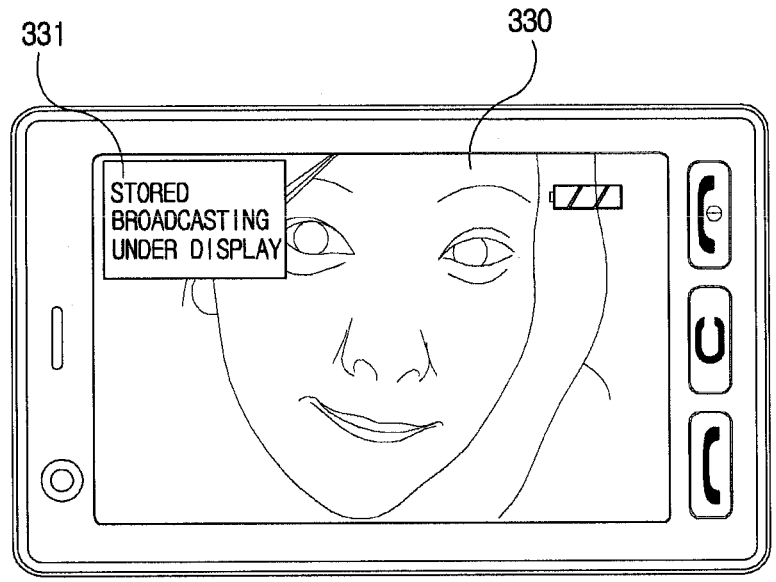
Figure 5:
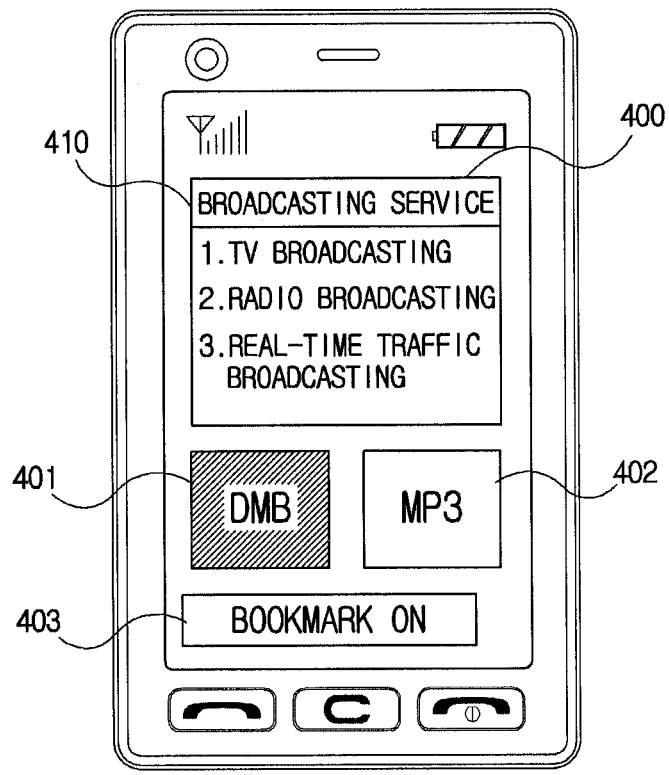
FIG. 5 is an image view illustrating a third example of a menu-executing method of a mobile terminal according to a first exemplary embodiment of the present disclosure.

FIGS. 3a and 3b are an image view illustrating a first example of a menu-executing method of a mobile terminal according to a first exemplary embodiment of the present disclosure, FIGS. 4a~4d are is an image view illustrating a second example of a menu-executing method of a mobile terminal according to a first exemplary embodiment of the present disclosure, and FIG. 5 is an image view illustrating a third example of menu-executing method of a mobile terminal according to a first exemplary embodiment of the present disclosure.

FIRST EXAMPLE

FIGS. 3a and 3b is an image view illustrating a first example of a menu-executing method of a mobile terminal according to a first exemplary embodiment of the present disclosure, where FIG. 3a illustrates wallpaper displayed on the display 151 of the mobile terminal 100. The wallpaper may be displayed with a menu icon 201, a phone number icon 202, an antenna indicator 203, a battery indicator 204 and a watch widget 205.

In a case an external audio output device such as an earphone is connected to the mobile terminal 100 while the wallpaper is displayed, an audio output-related menu 210 illustrated in FIG. 3b is displayed on the display 151. The audio output-related menu 210 may include a call icon 211, a video phone call icon 212, an MP3 icon 213, a DMB icon 214 and bookmark icon 215.

The connection of the external audio output device may be implemented by an earphone being connected to the wired/wireless headset port, or may be implemented by the earphone being connected to the mobile terminal using the short range communication module such as blue-tooth.

In a case the call icon 211 is selected, the controller 180 may transmit an audio call signal to the pre-stored number (i.e., the most recently received phone number in the recent call list or a phone number having a priority such as a phone number most frequently used by the user, or phone number pre-set by the user).

In a case the video phone call icon 212 is selected, the controller 180 may transmit the audio call signal to the pre-set phone number (i.e., the most recently received phone number in the recent call list or a phone number having a priority) (may be the same function key as the image call key of the mobile terminal).

In a case the MP3 icon 213 is selected, the controller 180 may display a list of the pre-set MP3 file (i.e. audio file) on the display 151. In a case the user is watching the list of MP3 file and selects the audio file, the selected audio file may be executed by a controller 180.

In a case the DMB icon 214 is selected, the controller 180 may display a broadcasting serve menu on the display 151. Alternatively, the controller 180 may activate the broadcasting receiving module 111 to allow a broadcasting of the preset channel to be instantly displayed.

In a case the bookmark icon 215 is selected, a bookmark menu preset by the user in the audio output-related menu may be displayed and one menu of the bookmark menu is implemented (entered) to allow a serve menu thereof to be displayed on the display 151, a detailed description of which will be explained in detail with reference to FIG. 5. In FIG. 3b, the bookmark menu is turned off to disable the execution of the bookmark function.

The audio output menu in the first exemplary embodiment is just for example, and other audio output-related menus such as an image file replay menu and a radio menu may be also included.

Although the present exemplary embodiment has described an example where the audio output menu is displayed on the display while the external audio output device is connected to the mobile terminal, the embodiment is not limited thereto. The embodiment may be applied to where the external audio output device is connected to the mobile terminal while the menu screen such as Internet screen and or a menu list screen is displayed.

At this time, in a case the external audio output device is disconnected, the audio output-related menu screen 210 may be reinstated to the wallpaper. The disconnection may be implemented in a case the ear-jack is separated from the wired/wireless headset port or a headset mounted with the short range communication module is positioned outside of the effective distance from the mobile terminal.

According to the first exemplary embodiment, in a case the external audio output device such as an earphone is connected to the mobile terminal, a menu related to the audio output is automatically displayed to the advantage of the user input.

SECOND EXAMPLE

FIGS. 4a~4d are an image view illustrating a second example of a menu-executing method of a mobile terminal according to a first exemplary embodiment of the present disclosure, where FIG. 4a illustrates a screen 300 on which broadcasting contents are displayed on the display 151.

That is, the broadcasting contents received from the broadcasting receiving module 111 of the mobile terminal is displayed on the display 151. At this time, in a case the external audio output device (earphone) is connected to the interface 170 or the short range communication module 115 of the mobile terminal 100 and the connection is released, the controller 180 may change the screen of the display 151 to the wallpaper and begin to store the currently-displayed broadcasting contents in the memory 160.

As shown in FIG. 4b, the display 151 is displayed with a storage screen including a broadcasting storage message 311 and a broadcasting storage bar 312.

The broadcasting storage bar 312 may represent the amount of storable broadcasting contents. That is, an entire length of the bar may correspond to the storable memory capacity. Meanwhile, the storage of the broadcasting contents may be terminated by the user selection.

Thereafter, in a case the external audio output device is re-connected to the mobile terminal 100, the stored broadcasting contents may be automatically displayed on the display 151 (see FIG. 4d). Alternatively, as shown in FIG. 4c, in a case a storage broadcasting display identification message 321 requesting whether stored broadcasting contents is to be displayed is displayed on the display 151 and the user selects YES icon 322, the stored broadcasting contents may be displayed on the display 151.

In a case the user selects NO icon 323, the stored broadcasting contents may not be displayed and wallpaper may be displayed on the display 151 instead.

Referring again to FIG. 4d, in a case the stored broadcasting contents is displayed on the display 151, a storage broadcasting display icon 331 may be displayed on one side of the display 151 to allow the user to identify that the currently displayed broadcasting is the stored broadcasting.

Meanwhile, the controller 180 may implement the time machine function of sequentially deleting the display-finished broadcasting contents time-wise by continuously storing the broadcasting contents currently received from the broadcasting receiving module.

According to the second exemplary embodiment of the present invention, in a case earphone is disconnected by an unexpected circumstance while the user uses the earphone to view the broadcasting contents, the broadcasting is stored therefrom to allow the stored broadcasting to be automatically displayed in a case the earphone is reconnected, whereby the user can view the broadcasting contents without any interruption.

THIRD EXAMPLE

FIG. 5 is an image view illustrating a third example of a menu-executing method of a mobile terminal according to a first exemplary embodiment of the present disclosure.

FIG. 5 illustrates an example where the audio output-related menu is displayed in a case the external audio output device is connected and the bookmark menu of FIG. 3b is set up on the priority base.

That is, in a case the user sets up at least one of the audio output-related menus as a priority audio output-related menu to allow the priority audio output-related menu to be displayed during earphone connection whereby the user can enter the menu very quickly, a bookmark ON menu (priority audio output-related menu) screen 400 may be displayed if the external audio output device is connected to the mobile terminal, as illustrated in FIG. 5.

The bookmark ON menu screen 400 may include a DMB icon 401, an MP3 icon 402, a bookmark icon 403 and a DMB menu list 410. That is, in the present exemplary embodiment, the DMB and the MP3 are set up as priority output-related menus, where in a case the external audio output device is connected to the mobile terminal 100 while the DMB is given a priority, the DMB icon 401 is automatically selected to display the DMB menu list 410 as depicted in FIG. 5. In a case the MP3 is selected, the DMB menu list is changed to the MP3 menu list (not shown).

Meanwhile, in a case the bookmark icon 403 is selected, the bookmark function (i.e., automatic execution function) is terminated, and the display 151 displays the audio output-related menu as illustrated in FIG. 3b. According to the third exemplary embodiment, the user can execute a desired menu more conveniently.

Now, a menu-executing method where an audio output device is connected to a mobile terminal according to a second exemplary embodiment of the present disclosure will be described with reference to FIG. 6~FIG. 9b.

Figure 6:
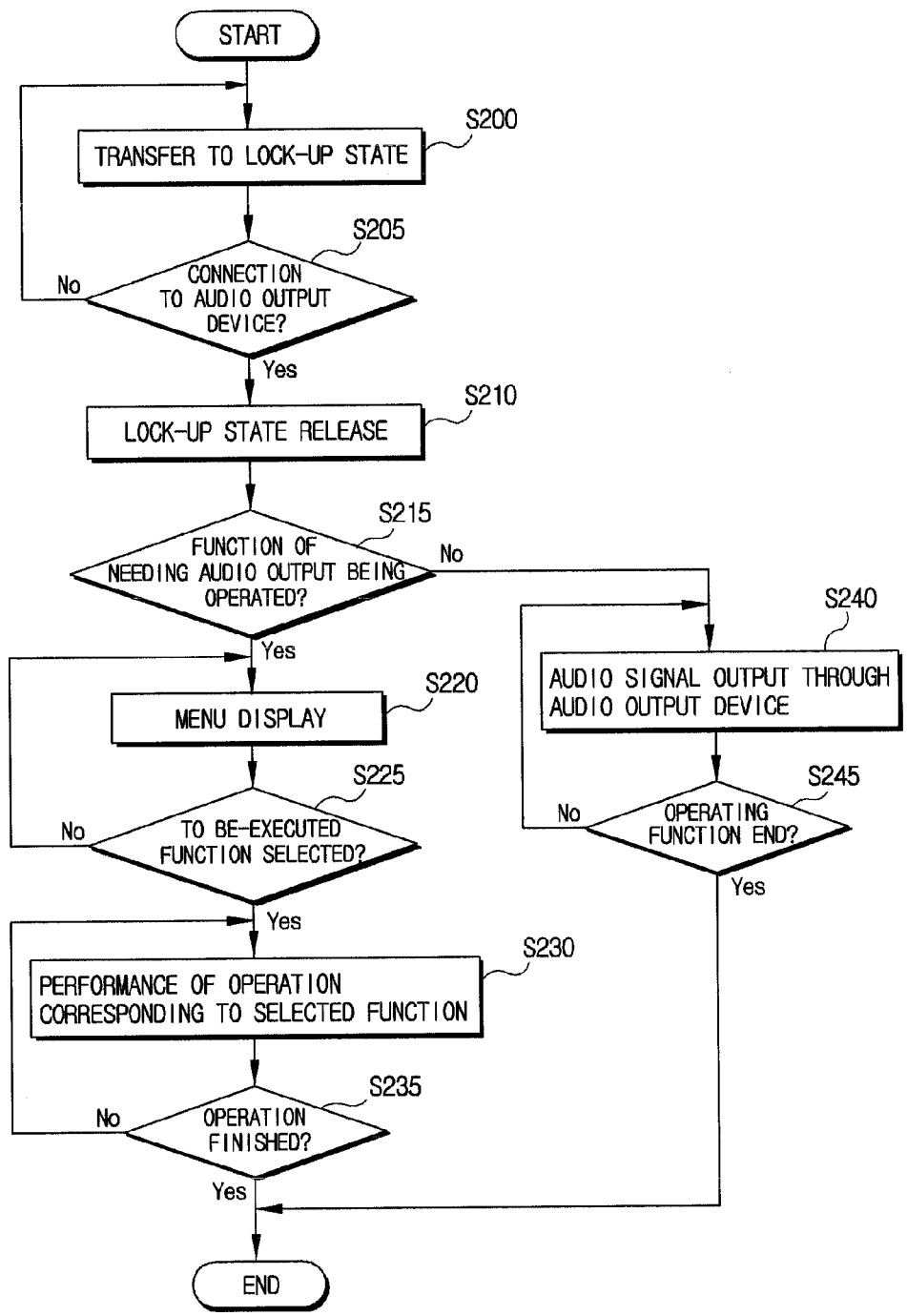
FIG. 6 is a flowchart illustrating a menu-executing method in a case an audio output device is connected to a mobile terminal according to a second exemplary embodiment of the present disclosure.

FIG. 6 is a flowchart illustrating a menu-executing method in a case an audio output device is connected to a mobile terminal according to a second exemplary embodiment of the present disclosure.

Referring to FIG. 6, in a case there is no touch input or a key input for a predetermined period of time, the controller 180 may control in such a manner that the menu is changed to a protective state or a lock-up state where no operation is implemented to the touch input or to the general key input (S200).

In the lock-up state, the audio output device such as the earphone or the headset is connected to the interface 170, the controller 180 may controllably release the lock-up state (S210).

In general, in a case the audio output device is connected through the interface 170, the interface 170 detects the connection to generate an interrupt, whereby the controller 180 may detect that the audio output device has been connected to release the lock-up state. In a case the lock-up state is released, a tactile effect indicating the release of the lock-up state may be generated.

Following the release of the lock-up state, the controller 180 may determine whether a function that calls for an audio output is operated (S215), where the function that needs the audio output may include a multi-media function such as a DMB viewing, an MP3 replay, a moving image file replay, a radio reception and a game execution, and a communication function such as audio communication or video image communication.

As a result of determination at S215, if it is determined that the function calling for an audio output is not operated, the controller 180 may select any one function of the functions calling for the audio output and display an executable menu on the display 151 (S220), where the menu may be displayed in the form of a pop-up window.

In a case any one function in the menus displayed on the display 151 is selected responsive to the touch input or the user input (S225), the controller 180 may control in such a way that an operation corresponding to the selected function be executed (S230). Furthermore, an audio signal resultant from the execution of the selected function may be outputted through the audio output device.

As a result of determination at S215, if it is determined that the function calling for an audio output is operated, the controller 180 may controllably allow the audio to be outputted through the connected audio output device until the end of operating function is selected (S240).

Through the thus mentioned processes, a menu is displayed that is executable by selecting related function in the form of pop-up window when the audio output device is connected, and the user can promptly execute the desired multi-media function or communication function through the menu.

Figure 7:
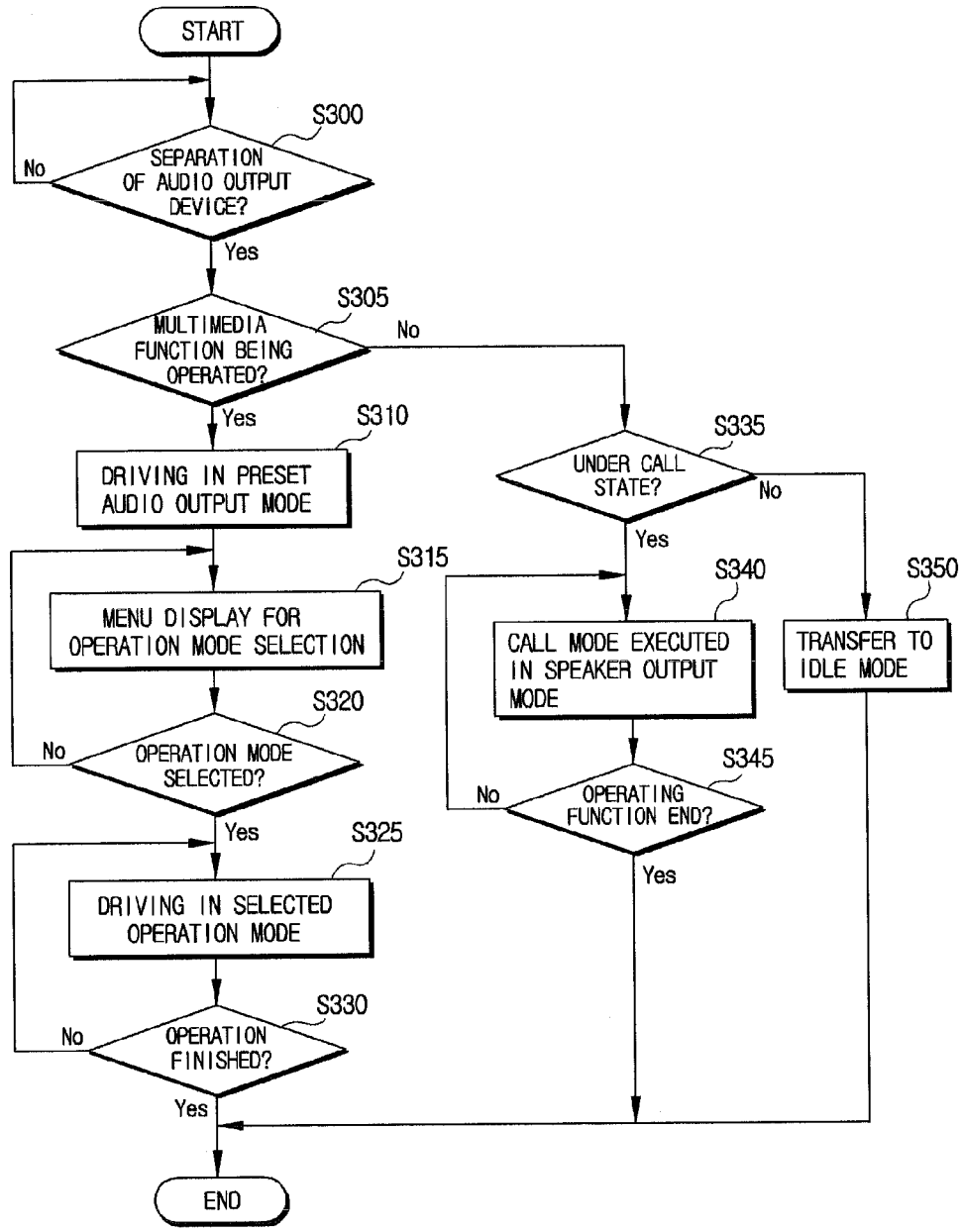
FIG. 7 is a flowchart illustrating a menu-executing method in a case an audio output device is separated from a mobile terminal according to a second exemplary embodiment of the present disclosure.

FIG. 7 is a flowchart illustrating a menu-executing method in a case an audio output device is separated from a mobile terminal according to a second exemplary embodiment of the present disclosure.

Referring to FIG. 7, in a case the earphone connected to the interface 170 or the audio output device such as a headset is separated (S300), the controller 180 may determine whether a function calling for an audio output is operated (S305). As mentioned above, the function that needs the audio output may include a multiple function such as a DMB viewing, an MP3 replay, a moving image file replay, a radio reception and a game execution, and a communication function such as audio communication or video image communication.

As a result of determination at S305, if it is determined that the function calling for an audio output is operated, the controller 180 may controllably allow the operation to be driven in a preset audio output mode (S310). The preset audio output mode, for example, may include a speaker output mode in which an audio signal is outputted through a speaker or a mute mode in which no audio signal is outputted.

Thereafter, the controller 180 may display on the display 151 a menu capable of selecting any one mode in other operation modes (S315), where the displayable mode may be a speaker output mode, a mute mode, a stop of driving function, a menu display end and the like. The menu-displayable items may be differently configured according to the preset mode, where the menu may be displayed in the form of pop-up window.

In a case the operation mode in the menu displayed on the display 151 is selected (S320), the controller 180 may controllably allow the operation mode to be driven until the operation end is selected (S325, S330).

If it is determined as a result of the determination at S305 that the state prior to the audio output device separation is a communicating state as a result of the determination at S305, the controller 180 may controllably allow the communication to be continuously carried out in the speaker output mode until the communication end is selected (S340, S345).

If it is determined as a result of the determination at S305 that the state prior to the audio output device separation is not a necessary function-operating state or a communicating state as a result of the determination at S305, the controller 180 may controllably allow changing to an idle mode (S350). According to these processes, the on-driving function may not be stopped to select a desired operation mode in the form of pop-up window during the separation of the audio output device.

Figure 8A:
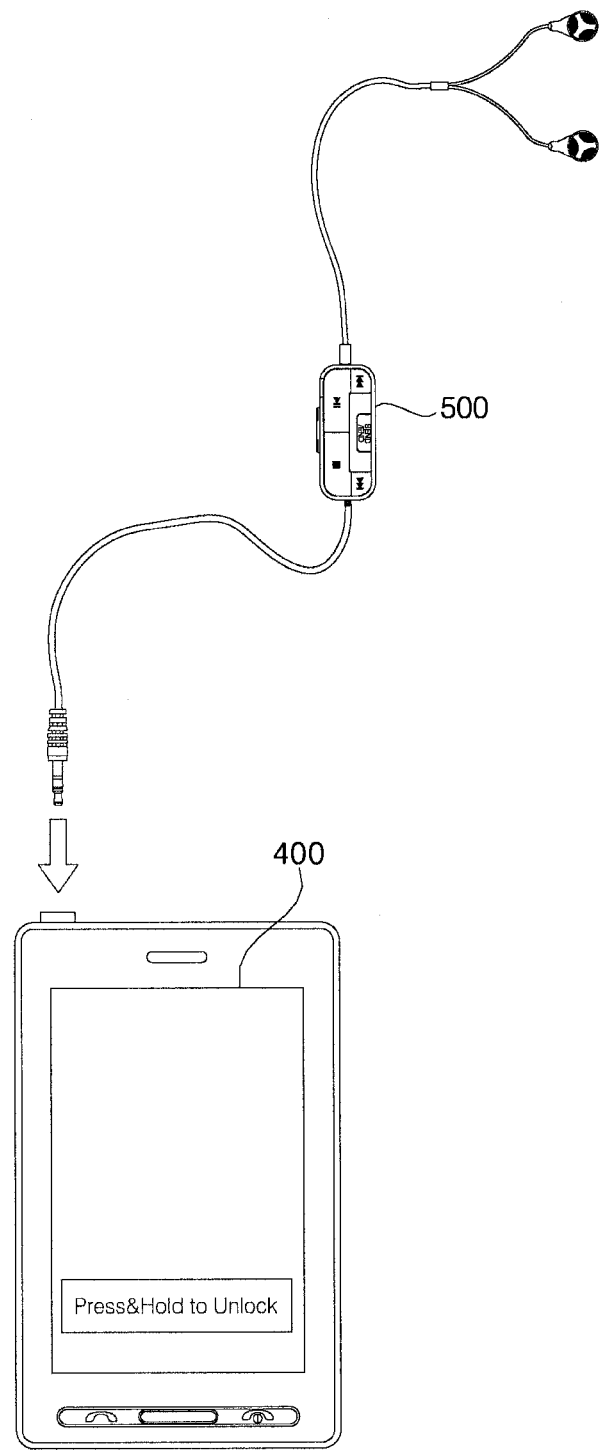
FIGS. 8a and 8b are schematic views illustrating an operation control process in a case an audio output device is connected to a mobile terminal according to the second exemplary embodiment of the present disclosure.
Figure 8B:
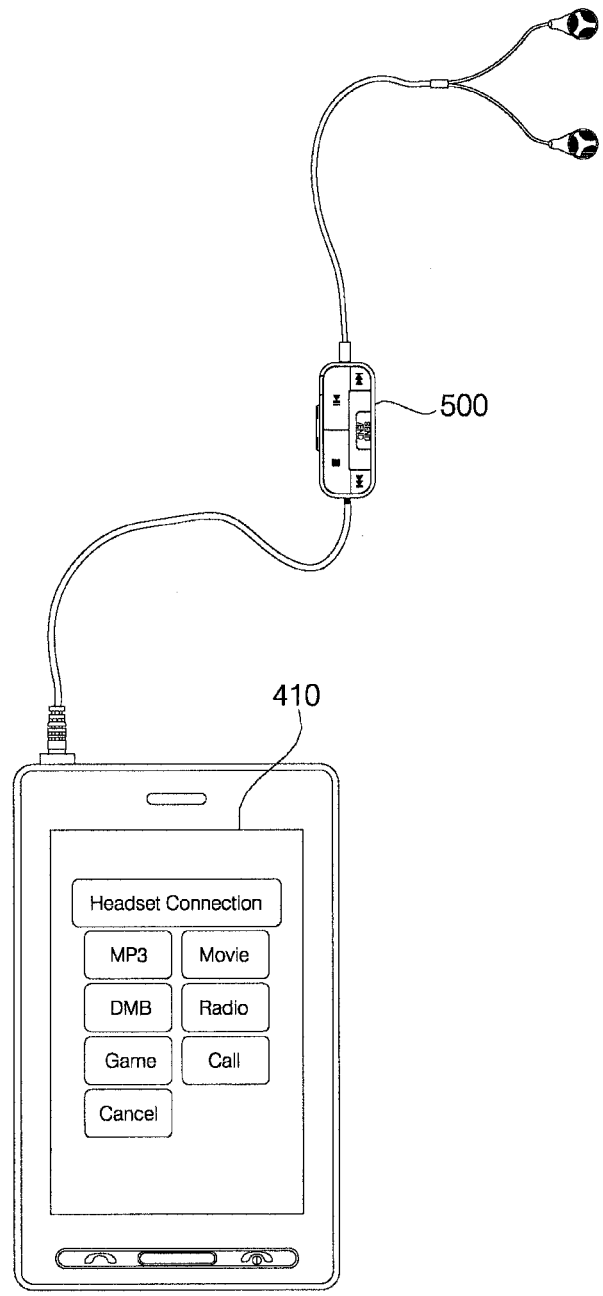

FIGS. 8a and 8b are schematic views illustrating an operation control process in a case an audio output device is connected to a mobile terminal according to the second exemplary embodiment of the present disclosure.

Referring to FIG. 8a, the mobile terminal 100 maintains a lock-up state prior to an audio output device 500 being connected.

Under this circumstance, in a case the audio output device 500 is connected, the lock-up state is released as shown in FIG. 8a, a screen 410 indicating functions such as 'MP3 ', 'Movie', 'DMB', 'Radio', 'Game' and 'Call', and a menu including items such as 'Cancel' capable of cancelling the display of menu, may be displayed. The user may touch any one item from the menu displayed on the screen 410 to execute a function related to the selected item.

In general, processes must be implemented in which the lock-up state is released and a main menu is displayed to select a multimedia-related menu and a function desired by the multi-media. However, the control method of the mobile terminal according to the present invention may be executed by two steps of processes of immediately selecting the desired function by connecting the audio output device.

That is, a case the user connects the audio output device to the mobile terminal is for the most part the case for execution of multi-media function or communication, the manipulation process may be simplified.

Figure 9A:
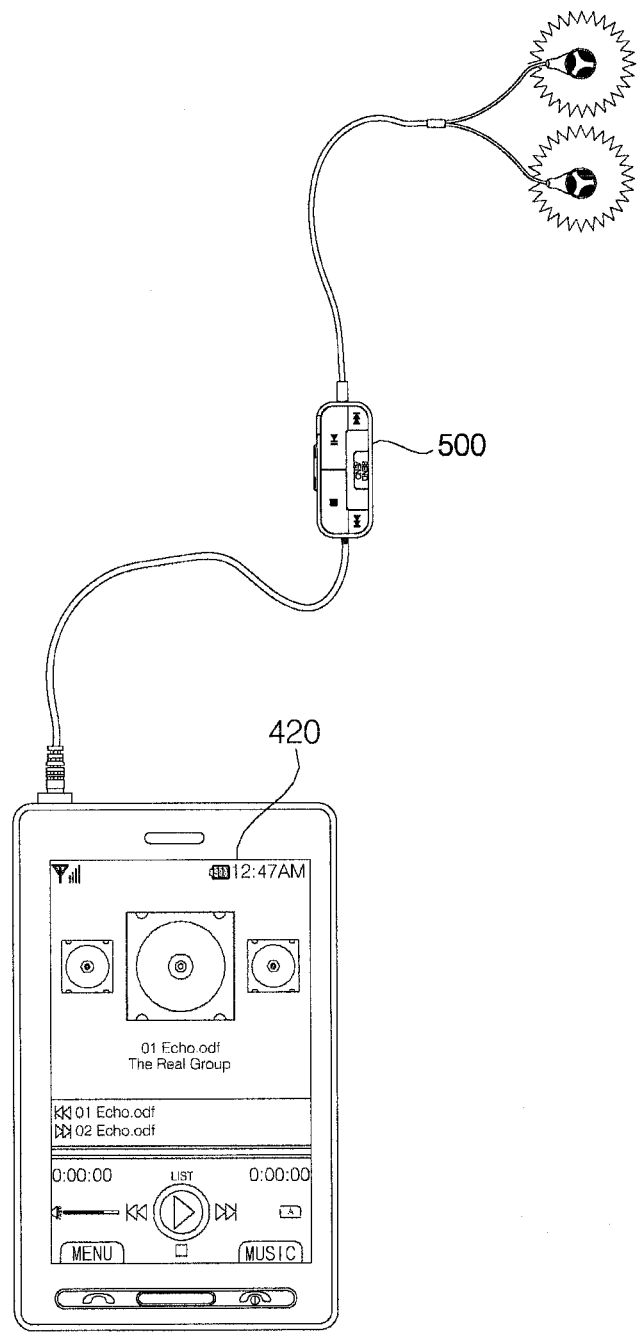
FIGS. 9a and 9b are schematic views illustrating an operation control process in a case an audio output device is separated from a mobile terminal according to the second exemplary embodiment of the present disclosure.
Figure 9B:
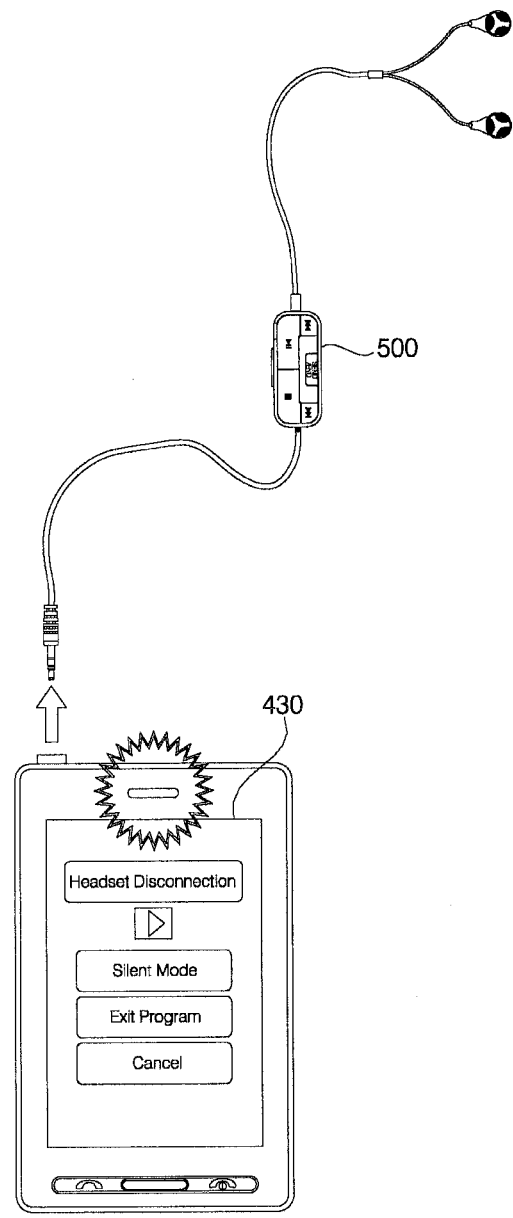

FIGS. 9a and 9b are schematic views illustrating an operation control process in a case an audio output device is separated from a mobile terminal according to the second exemplary embodiment of the present disclosure.

As depicted in FIG. 9a, an operation screen 420 corresponding to the display 151 is displayed while the multi-media function is being operated, and an audio signal is outputted through an audio output device 500. Under this circumstance, the audio output device 500 is separated, and As depicted in FIG. 9b operation is implemented in a speaker output mode that is set up in default, where the display 151 is displayed with a screen 430 displayed with a menu capable of selecting a mute mode, an end of ON-driving function and cancellation.

In a case the mute mode is set up as default, the operation may be executed in mute mode during separation of the audio output device, and the menu may include an item capable of selecting the speaker output mode. Thus, the manipulation process can be simplified during separation or connection of the audio output device through the above-mentioned processes.

The above-mentioned method for executing menu in a mobile terminal and the mobile terminal thereof may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

What is claimed is:

1. A method for executing a menu in a mobile terminal comprising:
    displaying a first screen on a display unit of the mobile terminal;
    detecting whether an external audio output device is connected to the mobile terminal while the first screen is displayed;
    displaying a second screen including broadcast contents when the external audio output device is connected;
    detecting whether the external audio output device is disconnected from the mobile terminal while the second screen is displayed;
    storing the broadcast contents on a memory of the mobile terminal while displaying the first screen when the external audio output device is disconnected;
    displaying a first notification message for indicating the broadcast contents being stored and a status bar for indicating an amount of stored broadcast contents, the first notification message and the status bar displayed on the first screen;
    detecting whether the external audio output device is re-connected to the mobile terminal while the first screen is displayed; and
    displaying a third screen including the stored broadcast contents on the display unit.

2. The method of claim 1, wherein the detecting whether the external audio output device is connected to the mobile terminal includes: detecting whether an earphone is inserted in an earphone jack of the mobile terminal or whether the external audio output device is connected to a short range communication module of the mobile terminal.

3. The method of claim 1, wherein the first screen includes one of a wallpaper or a menu screen.

4. A mobile terminal comprising:
    a display unit configured to display first to third screens;
    a memory configured to store data; and
    a controller configured to:
        detect whether an external audio output device is connected to the mobile terminal while the display unit displays the first screen,
        control the display unit to display the second screen including broadcasting contents when the external audio output device is connected,
        detect whether the external audio output device is disconnected from the mobile terminal while the display unit displays the second screen,
        store the broadcast contents on the memory while the display unit displays the first screen when the external audio output device is disconnected,
        control the display unit to display a first notification message that indicates storing of the broadcast contents and a status bar that indicates an amount of stored broadcast contents, the first notification message and the status bar displayed on the first screen,
        detect whether the external audio output device is re-connected to the mobile terminal while the display unit displays the second screen, and
        control the display unit to display the third screen including the stored broadcasting contents on the display unit.

5. The mobile terminal of claim 4, further comprising:
an earphone-jack configured to be connected to the external audio output device.

6. The mobile terminal of claim 4, further comprising:
a short range communication module configured to be connected to the external output device.

7. The method of claim 1, further comprising:
displaying a second notification message on the first screen, the second notification message for requesting whether the stored broadcasting contents is to be displayed.

8. The method of claim 1, further comprising:
displaying a notification icon at a portion of the third screen, the notification icon indicating that the stored broadcasting contents is displayed.

9. The mobile terminal of claim 4, wherein the controller is further configured to control the display unit to display a second notification message on the first screen, the second notification message for requesting whether the stored broadcasting contents is to be displayed.

10. The mobile terminal of claim 4, wherein the controller is further configured to control the display unit to display a notification icon at a portion of the third screen, the notification icon indicating that the stored broadcasting contents is displayed.

\* \* \* \* \*